United States Patent [19]

Martin et al.

[11] Patent Number: 4,947,979
[45] Date of Patent: Aug. 14, 1990

[54] TRANSFER APPARATUS

[75] Inventors: M. Warren Martin, Saline; Lawrence H. Weber, Ypsilanti, both of Mich.

[73] Assignee: R & B Machine Tool Company, Saline, Mich.

[21] Appl. No.: 244,833

[22] Filed: Sep. 14, 1988

[51] Int. Cl.$^5$ .............................................. B65G 15/00
[52] U.S. Cl. .............................. 198/343.1; 198/467.1; 198/625
[58] Field of Search ..................... 198/625, 343, 467.1, 198/792

[56] References Cited

U.S. PATENT DOCUMENTS

| | | | |
|---|---|---|---|
| 1,629,616 | 5/1927 | Fink | 198/461 |
| 2,156,105 | 4/1939 | Bergmann | 198/669 |
| 2,219,809 | 10/1940 | Davis | 209/545 |
| 2,923,395 | 2/1960 | Von Hofe | 198/436 |
| 2,992,454 | 7/1961 | Elphee | 264/161 |
| 3,578,412 | 5/1971 | Martin | 198/343 X |
| 3,652,369 | 3/1972 | Della Vite | 156/566 |
| 3,850,566 | 11/1974 | Moore | 198/343 X |
| 4,068,450 | 1/1978 | Easter | 198/343 X |
| 4,538,489 | 9/1985 | Takano | 82/71 |
| 4,605,047 | 8/1986 | Bausch et al. | 141/83 |
| 4,750,607 | 6/1988 | Focke | 198/792 |

Primary Examiner—Robert J. Spar
Assistant Examiner—Cheryl L. Gastineau
Attorney, Agent, or Firm—Reising, Ethington, Barnard, Perry & Milton

[57] ABSTRACT

Apparatus for transferring articles, such as containers, along a processing path includes a reciprocating slide with opposing, rotating feed screws disposed thereon for engaging the containers wherein reciprocation of the slide and rotation of the feed screws are coordinated in direction, time and speed to feed the containers along the processing path with a predetermined dwell of the containers at one or more work stations while the containers remain engaged between the rotating feed screws.

16 Claims, 6 Drawing Sheets

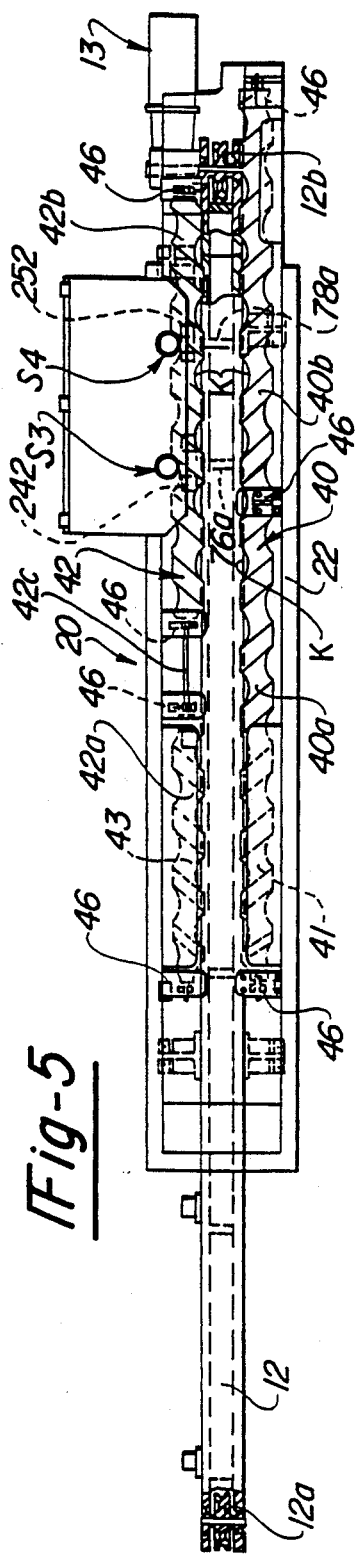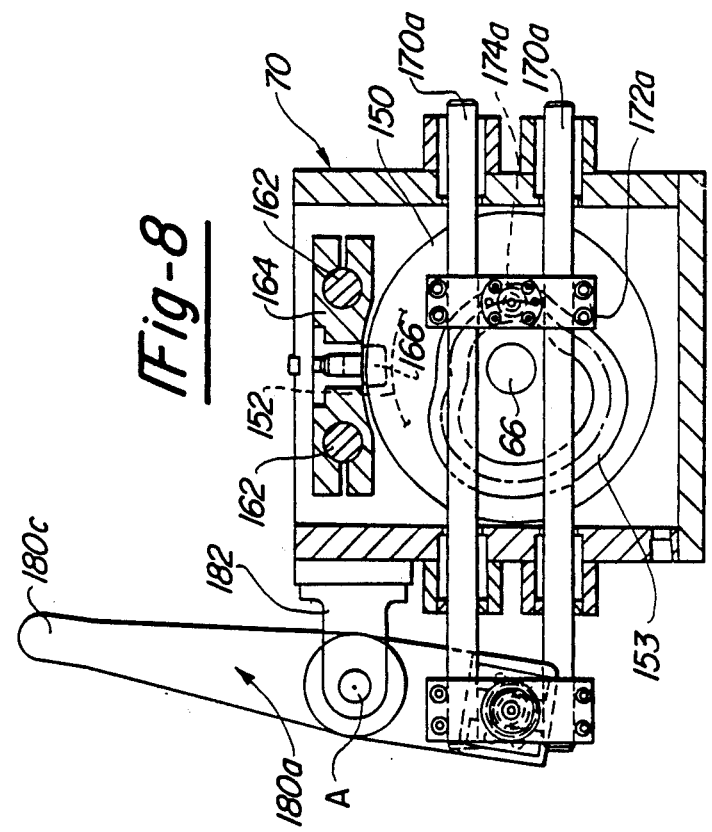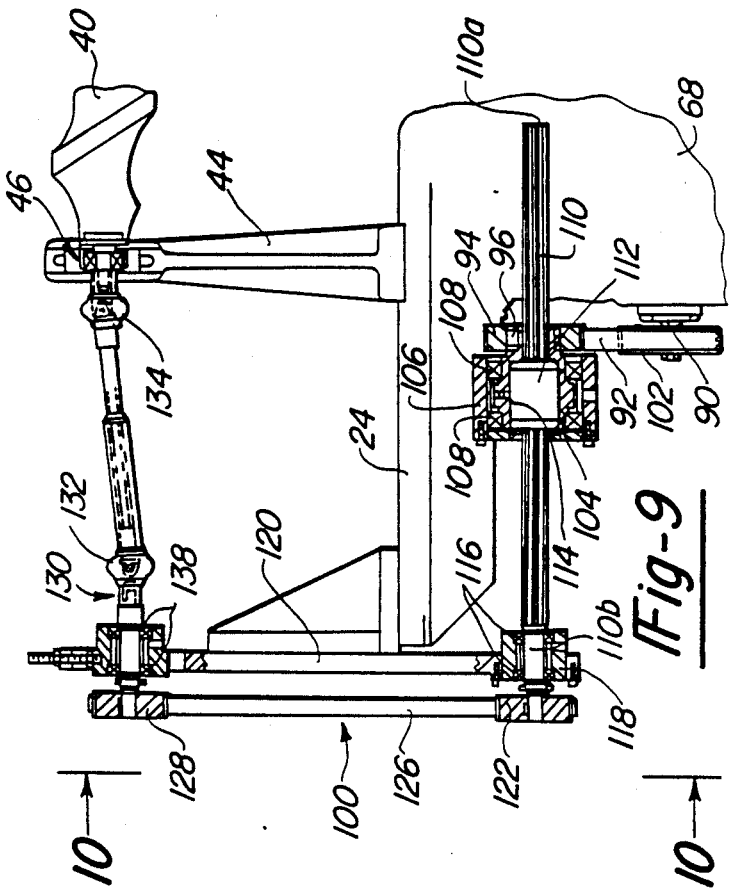

TRANSFER APPARATUS

FIELD OF THE INVENTION

The invention relates to apparatus for transferring articles, such as containers, along a path which may include one or more work stations where the articles are inspected, treated and/or worked.

BACKGROUND OF THE INVENTION

Various types of apparatus have been employed to move or transfer articles, such as containers, goods, etc., along a processing path for inspection, filling, treating, working and the like.

U.S. Pat. No. 1,629,616 issued May 24, 1927, to Fink; U.S. Pat. No. 4,605,047 issued Aug. 12, 1986, to Bausch et al and U.S. Pat. No. 4,538,489 issued Sept. 3, 1985, to Takano illustrate use of feed screws to move containers relative to one or more work stations. In the Fink and Tokano patents, the feed screws rotate in a stationary position relative to the work station. In the Bausch et al patent, opposing feed screws are pivoted toward and away from the containers in a direction transverse to the direction of advancement of the containers to allow them to be weighed. By withdrawing (pivoting) the feed screws away from and out of engagement with the containers, the containers are maintained in a temporary stationary mode or dwell at the weigh stations.

U.S. Pat. No. 2,922,454 issued Jul. 18, 1961, to Elphee employs a reciprocating slide having inflatable grippers to hold opposite sides of the containers as they are carried by the slide. During advancement of the slide toward the containers, a knife on the slide trims the bottoms of the containers. The grippers are then inflated to grip the trimmed containers and the slide is retracted to carry the containers to an unload station where the grippers are deflated to release the containers.

U.S. Pat. Nos. 2,156,105 issued Apr. 25, 1939; 2,219,809 issued Oct. 29, 1940; 2,923,395 issued Feb. 2, 1960 and 3,652,369 issued Mar. 28, 1972 also disclose use of one or more rotatable feed screws, which are mounted on a stationary base, to feed articles or goods along a processing path.

SUMMARY OF THE INVENTION

The present invention contemplates an apparatus for transferring articles, such as containers, along a path, comprising a reciprocating slide and an article engaging means, such as rotating feed screws, disposed on the slide for movement relative thereto and for engaging the articles wherein reciprocation of the slide and movement of the article moving means are coordinated in such a manner as to transfer articles along the path with a predetermined dwell of the articles at one or more locations, especially preferably at one or more work stations, along the path while the article remains cooperatively engaged with the article engaging means.

In a preferred embodiment of the invention, the article engaging means comprises a pair of opposing, rotating feed screws mounted on the reciprocating slide for capturing the articles therebetween. The speed, direction and timing of reciprocation of the slide and pitch as well as speed and direction of rotation of the feed screws are coordinated to feed articles, such as blown thermoplastic bottles, along the length of the path with a predetermined dwell of the articles at multiple work stations (e.g., a bottle trimming station, neck finishing station and inspection station) while the articles remain captured between the rotating feed screws.

Thus, the apparatus of the invention provides predetermined dwell of the articles while the slide and the feed screws remain continuously actuated without intermittent stopping and starting of the components of the apparatus.

The invention also contemplates a method of transferring articles in succession along the path.

BRIEF DESCRIPTION OF THE DRAWINGS

FIG. 5 is a plan view of the bottle transfer apparatus of FIG. 3.

FIG. 8 is a sectional view of the cam mechanism taken along lines 8—8 of FIG. 6.

FIG. 9 is a partial side elevation of the forward end of the bottle transfer apparatus showing drive linkages to the rotating feed screws.

BEST MODE OF PRACTICING THE INVENTION

The transfer apparatus of the invention will be illustrated hereinbelow with respect to a bottle transfer apparatus designed to receive blown thermoplastic bottles B from a blow molding machine M and to convey the blown bottles B along a processing path P having bottle trimming work stations S1,S2, neck finishing work station S3, and a neck inspection work station S4. At the trimming work stations S1,S2, plastic flash is trimmed from the bottle B, especially from the handle H as well as neck N thereof, FIG. 3. At the neck finishing station S3, the top of the neck N as well as inner diameter thereof is finished (cut to finished dimension). The inspection station S4 inspects the neck N to determine whether it has been properly finished and tests for leaks. Other work stations may be employed in lieu or in addition to those shown. The details of the work stations S1-S4 form no part of the invention.

Figure 1:
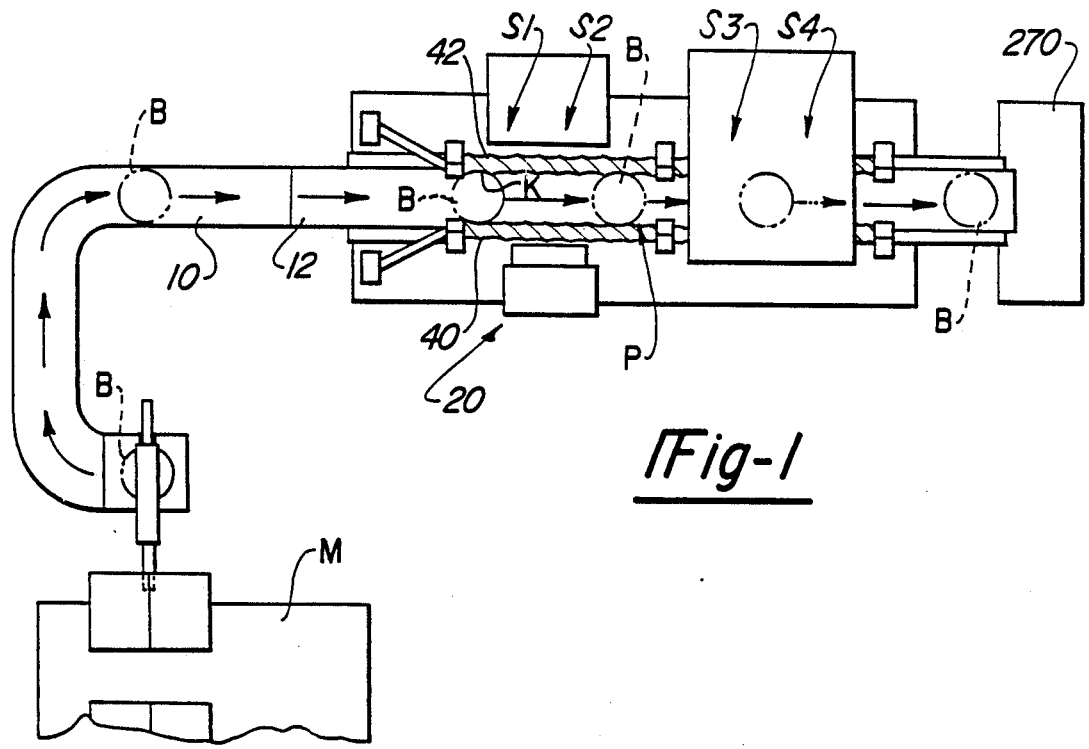
FIG. 1 is a schematic plan view of a bottle transfer apparatus of the invention associated with a bottle blow molding machine to receive blown bottles therefrom and to transfer the blown bottles past a bottle trimmer station, neck finishing station and inspection station.
Figure 2:
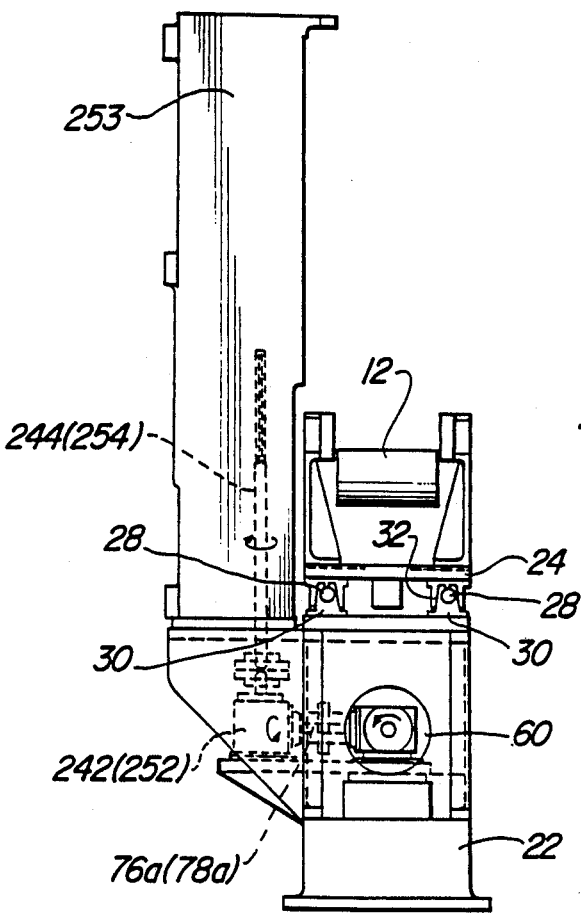
FIG. 2 is an end elevation of the bottle transfer apparatus with some components deleted for clarity.

An endless conveyor 10 extends from adjacent the blow molding machine M, FIG. 1, to a second linear endless belt conveyor 12 associated with the transfer apparatus 20 of the invention. The arcuate conveyor 10 is conventionally constructed and can employ a vacuum system (not shown) to hold the blown thermoplastic bottles B thereon as the bottles are transferred to the endless, linear belt conveyor 12. The endless, linear conveyor 12 is driven by sprockets 12a,12b and electrical motor 13 that rotates sprocket 12b, FIG. 5. The conveyor 12 carries bottles B to the transfer apparatus 20.

The transfer apparatus 20 of the invention includes a main base 22 on which a reciprocable slide 24 is mounted. The slide 24 is mounted for linear reciprocation on three sets 26 of axially spaced apart, parallel slide rods 28 fixedly mounted on the base 22 by mounting blocks 30 as shown best in FIGS. 3–4. The right hand slide rod 28 in each set is coaxial with the right hand slide rod 28 of the other sets. The left hand slide rods 28 are similarly coaxial.

The slide 24 includes depending mounting lugs 32 through which the slide rods 28 extend as shown so that the slide is reciprocable back and forth along the axes of the slide rods 28.

Figure 3:
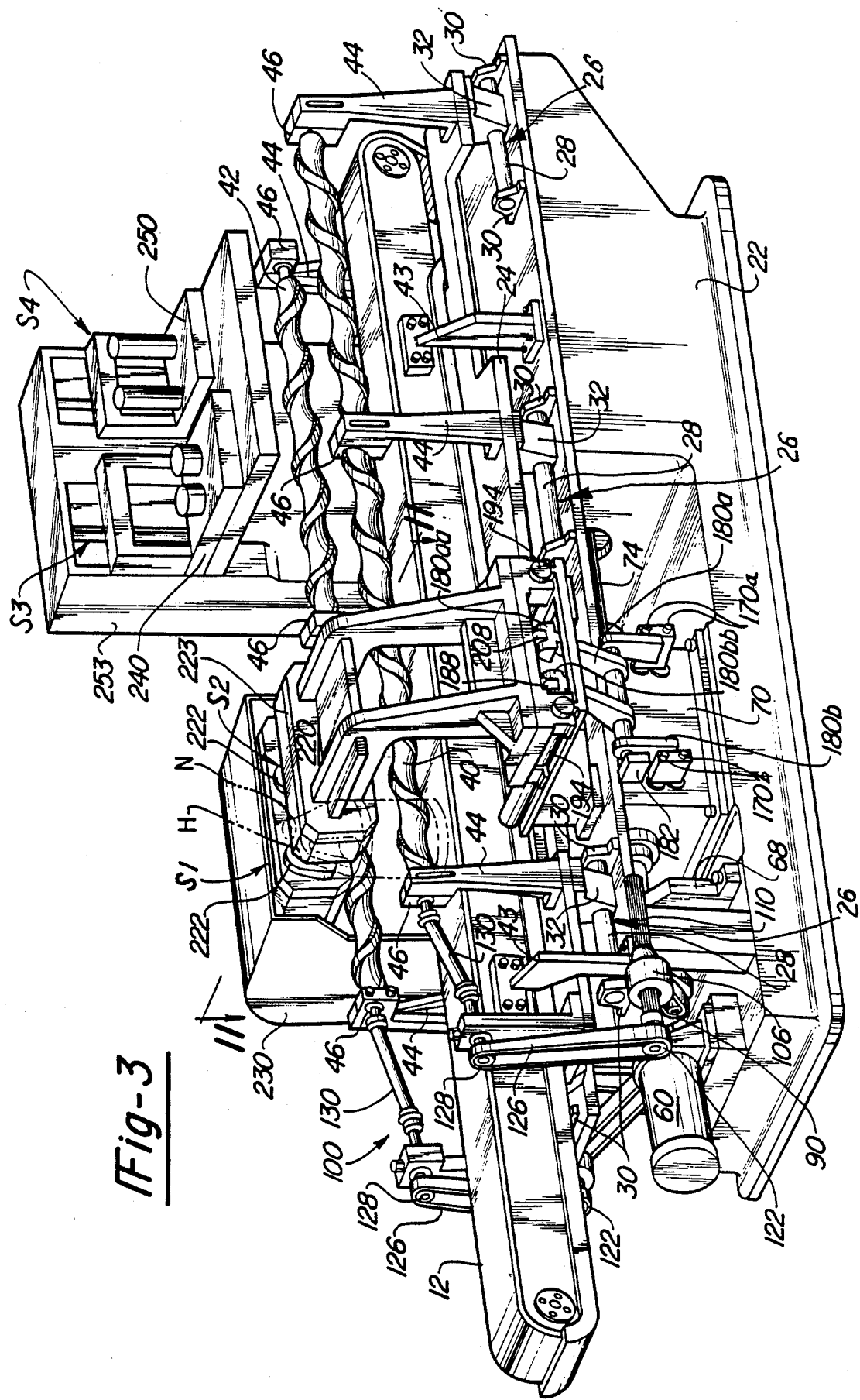
FIG. 3 is a perspective view of the bottle transfer apparatus of the invention.
Figure 4:
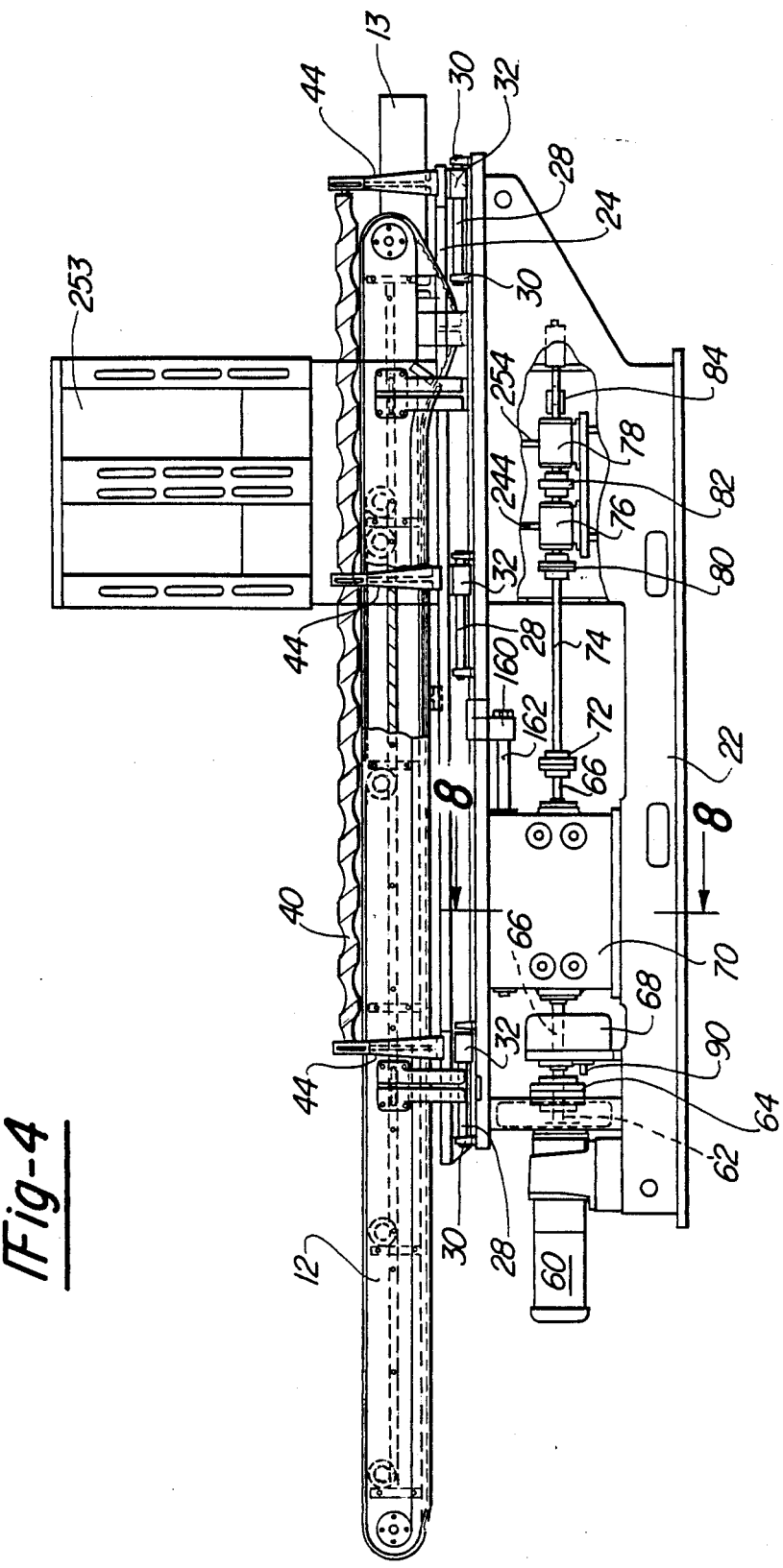
FIG. 4 is a side elevation of the bottle transfer apparatus of FIG. 3.
Figure 10:
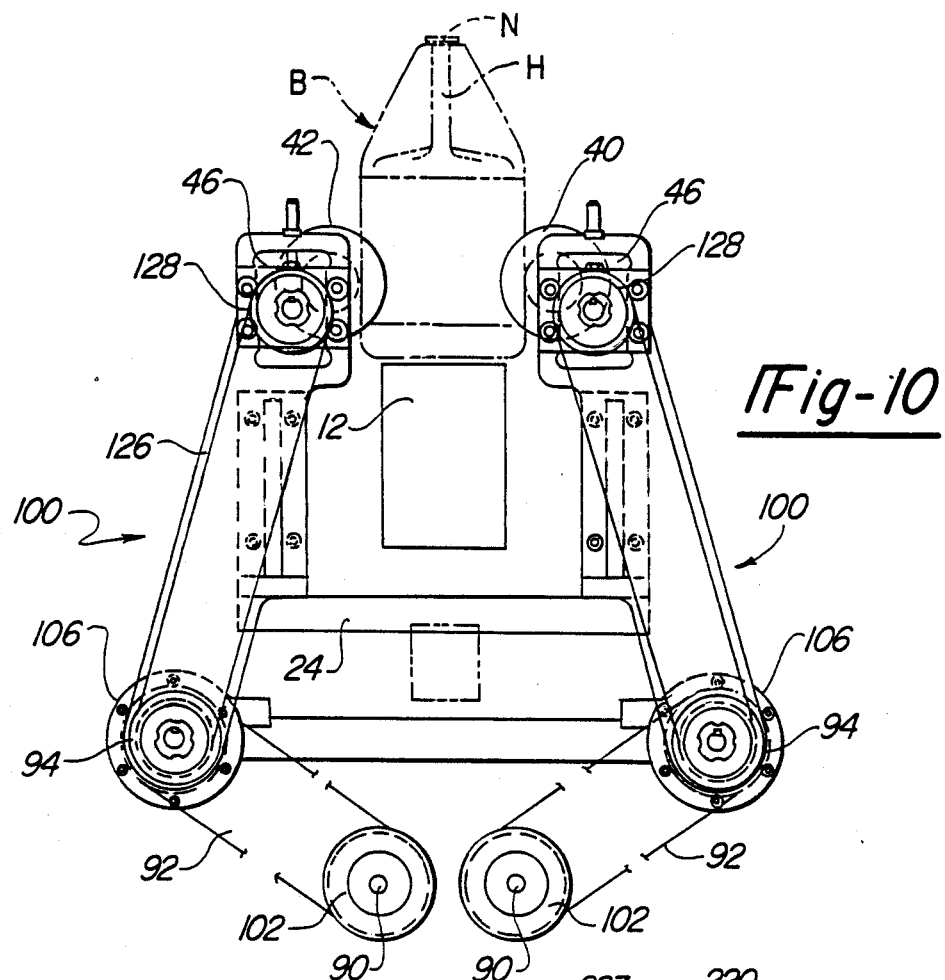
FIG. 10 is an elevation taken along lines 10—10 of FIG. 9.

A pair of opposing feed screw means 40,42 are rotatably mounted on upright supports 44 affixed on the slide 24 by bearing blocks 46, see FIG. 9 for details of the bearing blocks 46. Each screw 40,42 includes screw segments; e.g., 40a,40b and 42a,42b, interconnected at the supports 44 by the bearing blocks 46. Screw 42 may optionally include a cylindrical connector shaft segment 42c to provide space for removing a bottle B which has not been properly trimmed at station S1,S2. The screw segments 40a,40b and 42a,42b provide oppositely pitched screw threads 41,43 to move bottles B from left to right along the processing path P when the screw means 40,42 are rotated toward one another in opposite rotational directions. Pockets K are defined between the opposing feed screws 40,42 to receive, engage and capture a bottle B as it enters the processing path P. The bottles B are caused to slide over the conveyor 12 as they are transferred along the processing path P. The conveyor 12 optionally extends beneath the feed screws 40,42 as shown in FIGS. 3 and 10 and is supported therebeneath by a plurality of support brackets 43 mounted on the base 22. However, that portion of the conveyor 12 beneath the feed screws 40,42 can be eliminated as it is not essential to transfer of the bottles B.

As will be explained hereinbelow, the speed, direction and timing of reciprocation of the slide 24 and pitch of threads 41,43 as well as speed and direction of rotation of the feed screw 40,42 are coordinated to transfer the bottles along the processing path P with a predetermined dwell of each bottle B at the work stations S1–S4. In particular, the transfer apparatus includes an electrical motor 60 mounted on the base 22. The motor 60 includes an output shaft 62 connected (by coupling 64) to a drive shaft 66 of a two (2) speed gear box 68 also mounted on the base 22. The drive shaft 66 of the gear box 68 is rotatably mounted (by bearings 67) in and extends through a cam drive unit 70 to a coupling 72. From coupling 72, another drive shaft 74 extends to a first and second bevel gear drive units 76,78 with couplings 80,82 joining sections of the drive shaft 74. The drive shaft 74 extends via a gear coupling 84 to a rotary transducer 86 mounted on the base 22.

The two speed gearbox 68 includes a pair of rotary drive shafts 90, FIGS. 9–10, for driving the feed screws 40,42 in rotation at the same speed in opposite directions through drive linkage mechanisms 100. Each drive linkage mechanism 100 is identical and includes a drive pulley 102 on the rotary drive shaft 90, an endless drive belt 92 on the pulley and a driven pulley 94.

Driven pulley 94 is keyed (by key 96) on a hollow body 104 rotatably mounted in an outer housing 106 by anti-friction bearings 108. Housing 106 is affixed (stationary) on the base 22. A splined shaft 110 extends through a ball bearing spline shaft receiving assembly 112 held in fixed position in the hollow body 104 by one or more set screws 114. The assembly 112 allows rotation of the splined shaft 110 and hollow body 104 while allowing the splined shaft The splined shaft 110 includes a free, cantilevered end 110a and an opposite unsplined end 110b rotatably mounted (by anti-friction bearings 116) in support collar 118 affixed on the slide 24 by a support plate 120. The outermost portion of the unsplined end 110b has a pulley 122 thereon. A drive belt 126 extends from pulley 122 (lower pulley) to an upper pulley 128.

The upper pulley 128 is mounted (keyed) on a drive shaft 130 having universal joints 132,134. One end of the drive shaft 130 is rotatably mounted on support plate 120 by bearings 138 and the other end is rotatably supported on support 44 by bearing block 46 and drivingly connected to the feed screws 40,42, as shown best in FIG. 9, to rotate the feed screws at the same rotational speed in opposite directions.

Figure 6:
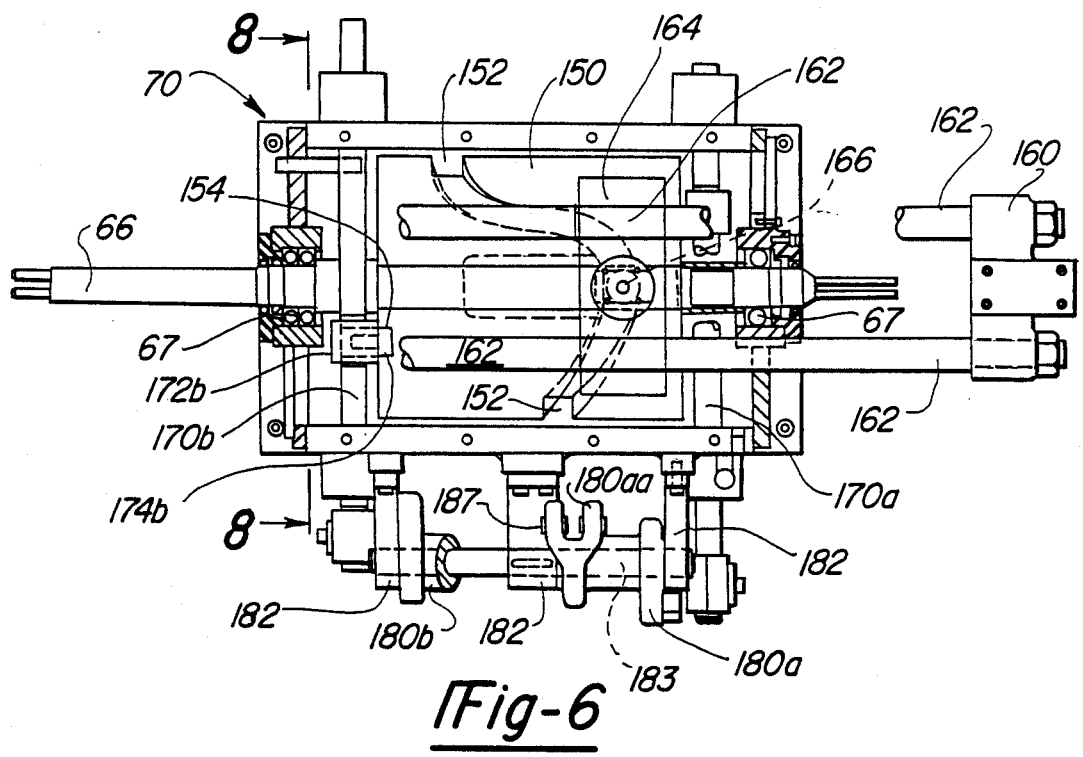
FIG. 6 is a top elevation, partially in section, of the cam mechanism of the bottle transfer apparatus with top portions removed to show internal components.
Figure 7:
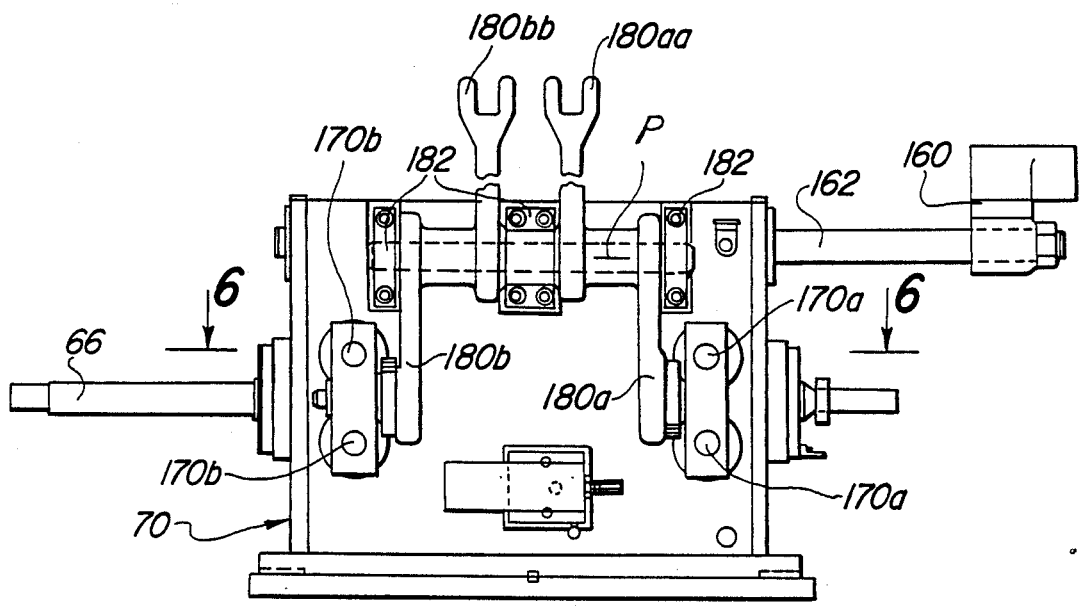
FIG. 7 is a side elevation of the cam mechanism of FIG. 6.

As mentioned hereinabove, the drive shaft 66 of the gear box 68 extends through the cam drive unit 70. The cam drive unit 70 includes a cylindrical barrel cam member 150 driven in rotation by the output shaft 66 (i.e., the cam member 150 is mounted on the output shaft 66 for rotation therewith). The barrel cam member 150 includes a first circumferential cam track 152, FIGS. 6 and 8, for driving the slide 24 in reciprocation and second and third annular end cam tracks 153,154 for driving the components of the trimming work stations S1,S2 as well be described hereinbelow.

With respect to reciprocation of the slide 24, the slide 24 includes a depending bracket 160 fixedly mounted on slidable guide rods 162. The guide rods 162 are fastened to a reciprocable plate 164 having a depending cam roller follower 166 that rides in the first cam track 152, FIGS. 6 and 8. The cam track 152 is configured to cause reciprocation of the plate 164, guide rods 162 and thus slide 24 in desired coordination (speedwise, directionwise and timewise) to effect the aforementioned temporary dwell of each bottle B at the work stations S1–S4 as the feed screws 40,42 rotate. The configuration of the first cam track 152 is shown best in FIG. 6.

As mentioned, the second and third annular cam tracks 153,154 drive the trimming work stations S1,S2. In particular, two pairs of guide rods 170a,170b are slidably mounted in bushings perpendicular to the output shaft 66 for reciprocation. The pair of rods 170a (the right hand pair in FIG. 6) are secured to a reciprocable plate 172 having a cam roller follower 174 that rides in the second cam track 153 on one end of the barrel cam member 150. The left hand pair of rods 170b are secured to a similar reciprocable plate 172 having a cam roller follower 174 in the third cam track 154 on the opposite end of the barrel cam member 150. The pair of rods 170a is drivingly connected to a lower end of a crank arm 180a while the pair of rods 170b is similarly drivingly connected to a lower end of a crank arm 180b. Crank arms 180a,180b are supported on a shaft 183 for pivotal motion about axis P. Shaft 183 is fastened to the side of the cam drive unit 70.

The crank arm 180b includes an upper end 180bb that is connected to a depending flange 188 disposed on the underside of a cross-slide 190 by a pin 187. Cross-slide 190 is slidably mounted on a pair of spaced, parallel slideway rods 194 disposed on the base 22, FIG. 3.

Figure 11:
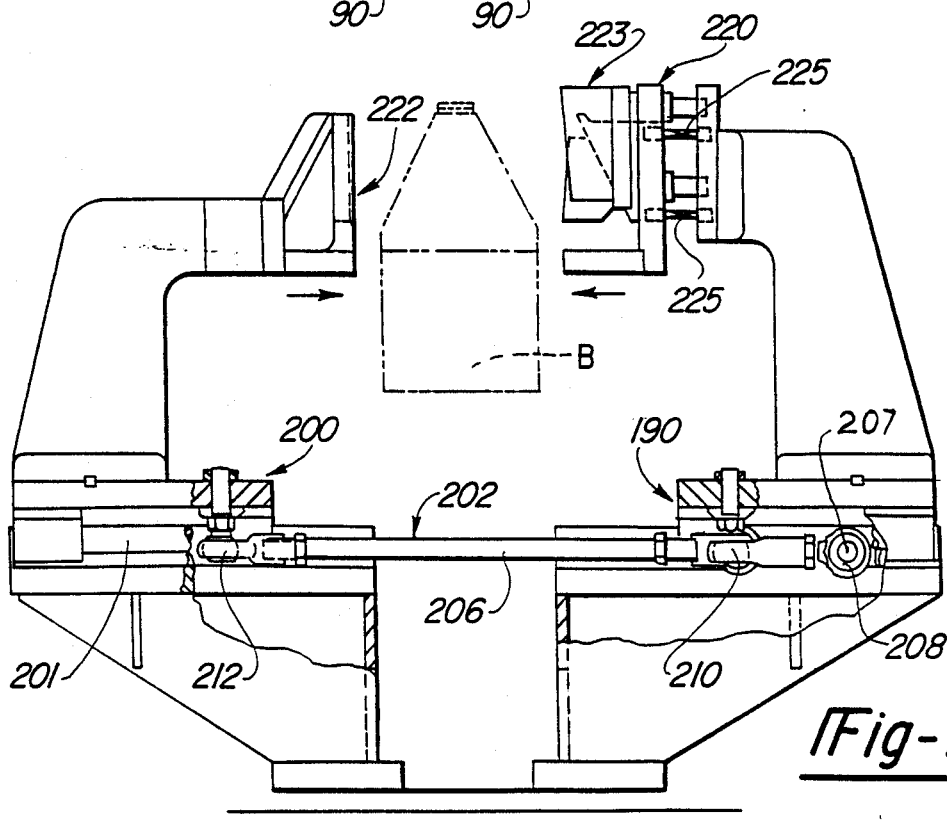
FIG. 11 is an elevation taken along lines 11—of FIG. 3 of the bottle trimming station.

The crank arm 180a includes an upper end 180aa that is operably connected to an opposing cross-slide 200 by a connecting rod linkage 202, FIG. 11. The connecting rod linkage 202 includes a main connecting rod 206 and swivel joints 208,210 operably connecting one end of the main connecting rod 206 to the cross-slide 190 and swivel joint 212 connecting the rod 206 to the cross-slide 200. Rod 207 of linkage 202 is connected to and is actuated by upper end 180aa of crank arm 180a. Cross-slide 200 is mounted for sliding movement on a pair of parallel slideway rods 201 (one shown) similar to slideway rods 194.

As shown best in FIG. 11, cross-slides 190,200 carry respective nesting dies 220,222 that are configured to include cavities 220a,222a to receive opposite sides of bottles B dwelling at stations S1,S2. Cross-slide 190 also carries trimming dies 223 configured to trim flash from a bottle B, especially around the handle H and the neck N, after the nesting dies 220,222 are moved together with a bottle B temporarily dwelled therebetween as a result of coordination of reciprocation of the slide 24 and rotation of feed screws 40,42 as described hereinabove. In particular, the nesting dies 220,222 are initially engaged by movement of the cross-slides 190,200 toward one another to capture respective bottles B as they dwell at stations S1,S2 therebetween and then the trimming dies 223 are advanced by continued motion of slide 190 to trim flash from around the handle H and neck N. To this end, the nesting dies 220 on the cross-slide 190 are spring-loaded (springs 225) to allow relative advancement of the trimming dies 223 relative thereto by continued movement of cross-slide 190 to effect trimming of the bottles B at stations S1,S2.

The second and third cam tracks 153,154 are configured to actuate crank arms 180a,180b to effect closing of the nesting dies 220,222 (by moving cross-slides 190,200 toward one another) when bottles B are dwelled at stations S1,S2 and to effect opening of the dies 220,222 (by moving cross-slides 190,200 away from one another) after trimming is complete. Cam track 154 is configured to also actuate crank arm 180b to effect continued movement of cross-slide 190 toward cross-slide 200 after the nesting dies 220,222 are closed to cause trimming dies 223 to trim the bottles B at stations S1,S2. A receptacle 230 may be positioned behind nesting dies 222 to receive cut-off flash from the bottles B at stations S1,S2. The flash may be blown by compressed air and/or sucked by vacuum in the receptacle 230 into the receptacle 230. It is apparent that the pockets K defined between the feed screws 40,42 capture and hold the bottles B with the handle H extending perpendicular to the direction of movement of dies 220,222 to enable trimming of flash from around the handle H.

After the bottles B are trimmed at either work station S1 or S2, the bottles are transferred along the processing path P to work station S3 for facing of the neck N and then to work station S4 for inspection of the bottles as the bottles are maintained in a temporary dwell or stationary position at the stations S3,S by virtue of the aforesaid coordinated reciprocation of slide 24 and feed screws 40,42.

The work stations S3,S4 typically include slides 240,250 that are movable on upstanding support base 253 downwardly to move a tool (not shown) or inspection probe (not shown) on the respective slide 240 or 250 into engagement with the bottle B at work station S3 or S4. The slides 240,250 can be driven in synchronism with the dwell of the bottles B at the work stations S3,S4 from bevel gear drive units 76,78. In particular, horizontal output shafts 76a,78a of units 76,78 drive other, adjacent bevel gear drive units 242,252 which in turn rotate drive shafts 244,254 that raise or lower the respective slides 240,250 by, for example, a cam/cam roll drive mechanism (not shown). The details of construction of work stations S3,S4 can be varied as desired to achieve the desired working action of the bottles B at these stations S3,S4 and the details of the work stations S3,S4 form no part of the invention except in so far as the slides 240,250 are driven up and down in synchronism with dwell of the bottles B at the stations S3,S4 as a result of the bevel gear drive units 76,78,242,252 discussed hereinabove, all of which are driven off common drive shaft 74 that is in turn driven by common shaft 66 of the gearbox 68.

As those skilled in the art will appreciate, the direction, timing and speed of reciprocation of the slide 24 and pitch of threads 41,43 as well as direction and speed of the feed screws 40,42 are coordinated to effect predetermined dwell of the bottles B at the work stations S1-S4 while the slide 24 reciprocates and while the feed screws 40,42 rotate with the bottles B captured therebetween in the pockets K.

After passing work stations S3,S4, the trimmed, faced and inspected bottles B are transferred by the conveyor 12 to a receptacle 270 at the outlet end of the processing path P.

Although the invention has been described hereinabove having the opposing feed screws 40,42 carried on the slide 24, those skilled in the art will appreciate that other article moving means, such as for example, an endless conveyor may be carried on the slide 24 and moved in coordinated manner relative thereto to effect a predetermined dwell of the bottles B (or other articles or goods) at the work stations disposed along the processing path.

Moreover, while the invention has been described in terms of specific preferred embodiments thereof, it is not intended to be limited thereto but rather only to the extend set forth hereafter in the following claims.

We claim:

1. Apparatus for transferring articles, comprising: a base, a slide disposed on the base for reciprocating, back and forth movement and a pair of oppositely rotating article-engaging screws disposed on the slide for movement relative thereto and spaced apart to engage the articles therebetween, said screws having a pitch and speed and direction of rotation so coordinated with the speed, direction and timing of reciprocation of said slide as to transfer articles in succession along a path with a predetermined dwell of each article at one or more locations along the path while the article remains engaged by the rotating screws.

2. The apparatus of claim 1 wherein the oppositely rotatable screws form a plurality of pockets therebetween with each pocket configured to engage and capture a respective article therein.

3. The apparatus of claim 1 wherein the screws are rotated and the slide is reciprocated by a common motor means.

4. The apparatus of claim 3 wherein the slide is reciprocated by a cam drive unit driven by said motor means.

5. The apparatus of claim 4 wherein the cam drive unit includes a cam track configured to reciprocate said slide in desired coordination with rotation of said screws when said cam track is rotated.

6. The apparatus of claim 5 wherein the slide includes a cam follower engageable with said cam track from reciprocation by rotation of said cam track.

7. The apparatus of claim 5 wherein the apparatus includes a work station adjacent said path and said work station is actuated by another rotatable cam track when one of said articles dwells adjacent thereto.

8. The apparatus of claim 7 wherein said work station includes opposing first and second dies and said cam unit includes first and second rotatable cam tracks for actuating the respective first and second dies.

9. The apparatus of claim 8 wherein said first and second cam tracks actuate the respective first and second dies to move toward one another.

10. The apparatus of claim 9 wherein the opposing first and second dies are carried on respective opposing first and second cross-slides and said first and second cross-slides include a respective cam follower thereon for engaging the respective first and second cam tracks.

11. The apparatus of claim 1 or 3 wherein the feed are rotated in opposite directions by a respective rotary drive shaft.

12. The apparatus of claim 11 wherein each screw is rotated by said respective rotary drive shaft through a drive mechanism including a splined shaft reciprocable with said slide and rotatable by said respective rotary drive shaft.

13. The apparatus of claim 1 wherein the screws rotate about spaced apart axes that are substantially parallel with the direction of reciprocation of said slide.

14. A method for transferring a plurality of articles in succession along a path, comprising:

(a) reciprocating a slide in back and forth manner
(b) mounting a pair of spaced apart, oppositely rotating article-engaging screws on the slide so as to engage the articles therebetween, and
(c) so coordinating the speed, direction and timing of reciprocating of the slide and the pitch and speed and direction of rotation of the screws as to transfer the articles in succession along a path with a predetermined dwell of each article at one or more locations along said path while the article remains engaged by the rotating screws.

15. An apparatus for transferring articles, comprising:
a base, a slide disposed on the base for reciprocating, back and forth movement, article-engaging means disposed on the reciprocating slide for movement relative thereto and for engaging the articles wherein reciprocation of said slide and movement of said article engaging means relative thereto are coordinated in such a manner as to transfer the articles in succession along a path with a predetermined dwell of each article at a plurality of locations along the path while the articles remain engaged by said article engaging means,
a workstation disposed adjacent each location, the work station being actuated to engage a respective article dwelling thereat, and
a common drive unit for reciprocating the slide and for actuating the work station when a respective article dwells thereat.

16. The apparatus of claim 15 wherein the drive unit includes a fist cam track for reciprocating the slide and a second cam track for actuating the work station.

* * * * *